July 17, 1962 H. B. MAIER 3,045,179
SOLID STATE ELAPSED TIME INDICATOR
Filed Sept. 8, 1959 2 Sheets-Sheet 1
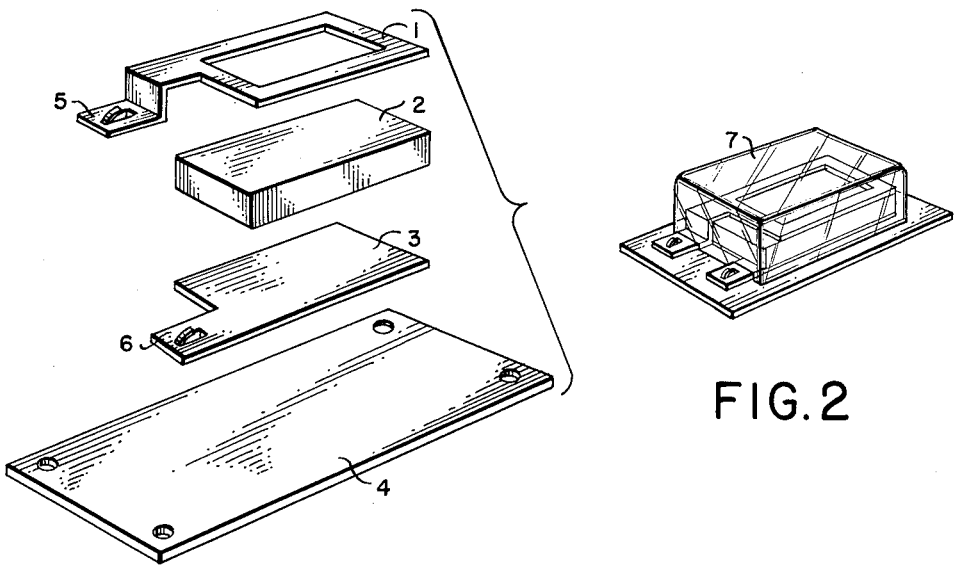
FIG.1
FIG.2
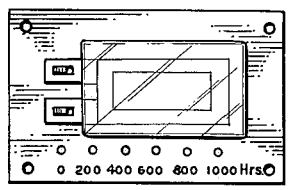
FIG.3
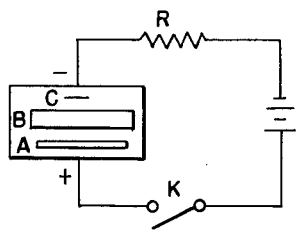
FIG.4
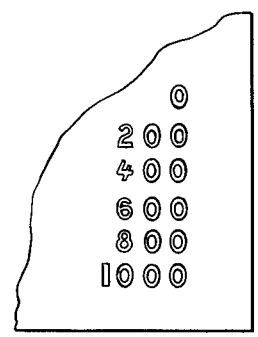
FIG.5
INVENTOR
Henry B. Maier

United States Patent Office 3,045,179
Patented July 17, 1962

3,045,179
SOLID STATE ELAPSED TIME INDICATOR
Henry B. Maier, New York, N.Y.
(6 Sealey Ave., Hempstead, N.Y.)
Filed Sept. 8, 1959, Ser. No. 838,805
12 Claims. (Cl. 324—68)

This invention relates to an integrating timing device, and more particularly to an integrating timing device which is simple and inexpensive in construction and which can operate over very wide ranges of temperature.

It is an object of this invention to provide an elapsed time indicator which totalizes or integrates the time during which an electric circuit has been operating, whether continuously or intermittently. The action or method whereby this is accomplished is based upon chemical or electrochemical reactions conducted in materials existing largely or entirely in the solid state. The device consists essentially of an electrically conductive or semi-conductive solid block, against which an anode and a cathode are placed. When current is passed through the device chemical changes take place within the block, resulting in changes of color, or color intensity, or appearance of a haze or precipitate, or growth of crystals, or crumbling or breakdown of the physical shape, or some other visible evidence of change within the block, or on the surface of the block, or on portions between the block and one of the electrodes, or at the surface of one or both of the electrodes. The length of time during which current has been flowing is indicated by any one or more of these changes. If, for example, the device had been prepared and the composition of the block formulated or chosen so that changes of color intensity occur with the passage of current, then the length of time during which the device had been in operation may be determined by comparing the color intensity of the block against a previously prepared color reference chart. This chart would show color intensity changes resulting from particular lengths of time of operation, whether continuous or intermittent, for periods such as 200 hours, or 400 hours, or 1,000 hours, or other lengths of time. For ranges of time of shorter or longer duration the composition of the materials and block, and use of a suitable external resistor to modify the quantity of current are selected to cause operation to occur within the desired time scale. Thus, time of operation may be determined.

Other aspects and parts of the invention will be in part obvious, and in part pointed out in more detail hereinafter.

The invention accordingly consists in materials, chemical reactions, features of construction, combination of elements, and arrangement of parts and materials which will be exemplified in the description and construction hereinafter set forth, and the scope of the application as described throughout the application and indicated in the appended claims. It should be emphasized that the exemplified materials used in the construction, and the designs, the arrangements or choice of parts and the shapes are only examples of many variations possible that fall within the scope, intentions and claims of the invention.

In the drawings:

FIG. 1 is an exploded view showing the insulating base, anode, conductive block, and cathode for one particular design of a solid-state elapsed time indicator.

FIG. 2 is a perspective view of the assembled unit, and shows the operating parts enclosed by a glass or plastic case.

FIG. 3 is a top view of the same unit, and shows an imprinted color intensity scale used for determining time of operation of the indicator.

FIG. 4 is a simple schematic drawing of the unit depicting the anode (A), the solid-state conductive block (B), the cathode (C), the external resistor (R) which controls the direct current, and the on-off arrangement represented by the switch (K).

FIG 5 is an example of a direct reading time scale. As the current flows imprinted numerals previously not visible come into view due to chemical changes taking place between the electrode and the material comprising the numerals.

Figure 6:
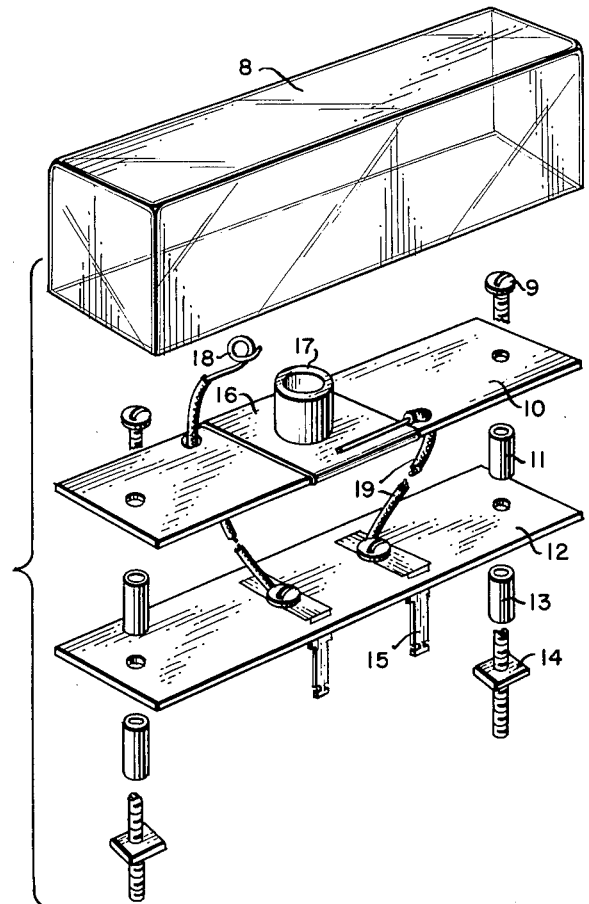
FIG. 6 (second page of drawings) is an exploded view of another type of solid-state elapsed time indicator. Construction differs from FIG. 1, but the principle of operation is the same.
Figure 7:
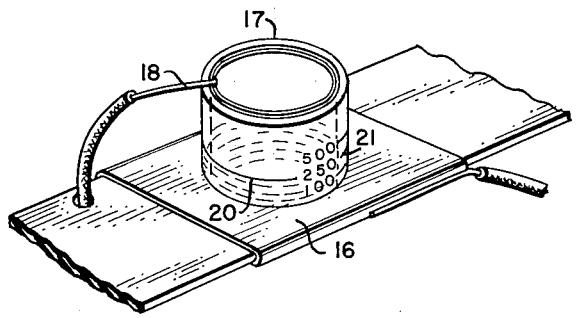

FIG. 7 is a detail view of FIG. 6, and shows the electrodes and conductive solid material. The solid material is contained in a glass or plastic ring fastened to the anode. An optional time scale printed in the side of the ring permits determination of the time of operation. As time passes with a uniform current flowing, the boundary line of the color change progressively moves upward, and operation is measured by the scale which reads in hours, minutes or other convenient terms.

Referring to the drawings, the general operation is achieved through parts and materials of a type exemplified in FIGS. 1 and 2. A metallic anode 3 is in contact with a conductive block 2. A cathode 1 is also in con-contact with the block. When the current passes from the anode through the block to the cathode chemical reactions take place, resulting in chemical and physical changes of the block and one or both of the electrodes.

The following electrode reactions show one way by which the changes may occur:

At the anode metallic ions are generated from the metal atoms of the anode by the passage of current.

or

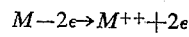

(where $\epsilon$ is an electron and M is a metal atom chosen so that a resulting compound MX may be formed which differs in appearance from the compounds or materials forming the block or the electrodes.)

The reaction within the block, or at the interface between the block and the anode is:

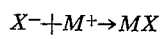

or

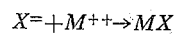

(where $X^-$ is an ion or molecule which is present in the block, and unites or reacts with the metallic ion $M^+$.)

Thus passage of current produces physical or chemical changes which may be utilized to indicate time of operation. The total amount of product formed MX, is dependent upon the number of electrons passing through the device. The current generates the metallic ions; they do not exist until the current is in effect.

Other types of reactions may be chosen for the solid-state device provided the reactions result in the visible change, such as the formation of an insoluble colored precipitate, or a colloidal suspension of colored matter, or a change in the shape of the block, or some other visible form of change. For example, a black colloidal dispersion of metallic silver particles may be produced if materials of construction are chosen such that silver ions are generated at the anode, migrate into the block and are subsequently reduced at or near the interface by chemical compounds within the block.

If the anode is copper or brass and the block contains magnesium sulfate then the compound which is formed is copper sulfate, a green material which is distinctive in color from either the copper or brass color, or the transparent or cloudy white appearance of the magnesium sulfate.

The conductive block may vary in composition and should preferably be transparent, but may be transluscent or cloudy white, or even colored if the color differs from the color of the material produced by the passage of the current. The product or change which occurs may appear within the block or at one or more of the surfaces, or the change may take place on the electrode as, for example, by electrolytic erosion of the anode, resulting in a color change on the surface of the anode where contact exists with the block or conductive solid material.

The block may consist of a large cut crystal of an inorganic salt such as magnesium sulfate, or sodium salts, or the block may be a composition of plastics or resins with salts or other materials dispersed within, or in solid solution, to aid in conduction. The plastic may contain polar or other functional groups to aid in conduction. Organic binders, or adhesives such as mucilage may be used to bind particles of inorganic or organic salts. The block might contain dye particles which change color upon the oxidizing or reducing action at the electrodes, when current is flowing. For many of the chemicals or materials mentioned for use in the block an additional small amount of water, in the form of water of hydration, such as hydrated salts, or water bound in the resin, such as with polyvinyl alcohol resin, might also be used to further aid conduction.

Since current determines the number of ions formed at the anode, and consequently the amount of resulting product, the temperature is relatively unimportant and the device may operate over wide ranges of temperature. Because the conductive block is a solid there is no concern about the block not operating at sub-zero temperatures, where liquids freeze, or at elevated temperatures, where liquids boil. The device can operate over temperature ranges of hundreds of degrees and is limited only by selection of materials which do not deteriorate or vaporize at the operating extremes of temperature.

The base of the device 4 may be plastic or composition board, or, if high temperature ranges are encountered, Pyrex glass. The cathode 1 may be any suitable metal. The cathode serves mainly as an electrical contact to the block, and its design should not obstruct a clear view of the block and the anode. Types of terminals permitting connection to the external circuit are exemplified by 5 and 6. A protective cover 7 which is cemented or fastened to the base may be plastic or Pyrex glass or other suitable material. The cover may be hermetically sealed to the base if desired.

FIG. 3 is a top view of the device and shows a time scale imprinted on the insulating base 4. This particular scale shows changes of color intensity with time of operation, for a given value of current, and serves as a reference scale when looking down through the transparent cover and observing the change of color intensity of the device. Other types of scales may be used indicating, for example, color changes rather than color intensity changes. Thus, depending upon the formulation of the block, operation may be shown by changes as, for example, yellow to orange to red to brown, or silver to yellow to red to blue. Changes of color intensity, however, such as shades of gray to black, or shades of brown or green are more easily read if the observer cannot differentiate between certain colors, or is color blind.

The operating current is determined by selection of a proper value of external resistor R such as illustrated in the general type of schematic drawing shown by FIG. 4. The resistor R may be mounted on the device or may be mounted externally as part of the external circuit. The circuit is preferably direct current but may contain a superimposed alternating current of a specific value. Proper values for the resistor must be specified for any selected time scale and circuit conditions.

FIG. 5 is an example of a time scale which reads directly without need for comparison elesewhere with a similar change of color or color intensity. In this example numerals are imprinted upon the face of the anode, using semi-permeable films of varnish or coating material, or insulating varnish or other suitable transparent coatings. As the numbers increase in value, such as 200 to 400, an increasing thickness of coating is printed, as, for example, by repeated printing or by use of a coating formulated to have greater density or insulating value, or less permeability to ion migration. As another variation, the entire surface of the anode except for the exact area where the numerals appear is heavily coated with one of the varnish types just mentioned and each number area, in decreasing number order such as 400 to 200, receives a varnish coating of decreasing thickness, or coating having less insulating value or greater permeability. The thickness, insulating values, or porosity or permeability of each number printed is carefully controlled so that results may be reproducible in mass production of the devices. When the numerals have been printed the conductive block or a thin conductive solid material is then placed or applied over the anode, or the anode is coated with a material which will set or dry to form a conductive solid. On top of the conductive block or solid material the cathode is then placed. When the device is in operation the consequent result is that the numerals come into view. The lower numerals come into view first, in proper order, as time of operation continues because the low end of this direct reading time scale is designed to be affected first by the current, in accordance with the general principle of operation of the solid-state elapsed time indicator invention.

FIG. 6 shows another design for a solid-state elapsed time indicator. A transparent plastic cover 8 fits over the operating portions and rests on the insulating base 12. The cover is cemented to the base. Structural parts are held in position by the screws 9, the plastic or metal separating collars 11 and 13, and the retaining screws 14. Mounting to a chassis or piece of equipment is provided by the lower end of the screws 9. A second retaining nut fits over the end of the screw after mounting, to secure the device in its mounted position. Connections to the external circuit is provided by the short terminals 15. The anode consists of a metal foil 16, such as silver or brass, wrapped around and fastened to an insulating board 10. The foil may be cemented in areas, or stapled or otherwise held in position. A connecting wire 19 connects the anode to the proper terminal, and a similar connecting wire 18 runs from the other terminal to the upper surface of the conductive block, where it forms the cathode connection. The cathode is in the form of a wire loop, and is arranged to press against the conductive material. This conductive material may be contained in a plastic or glass ring 17 which is cemented to the anode. The wires are insulated, except at the ends, where they make electrical contact. The connection to the anode is made against the under surface of the foil or thin metal strip which forms the anode.

FIG. 7 is a detail drawing of FIG. 6, and shows an optional time scale 21 printed on the glass or plastic ring. As the device operates, from the lower portion of the conductive solid, which may be magnesium sulfate, in the form of a large crystal cut to the proper dimensions, or a composition containing magnesium sulfate, or any other suitable conductive solid material, a change of color is seen and the boundary line 20 of the color change travels upward during time of operation. The time scale 21 permits reading the time of operation by comparing the position of the boundary line with its position on the scale.

Thus it can be seen that there has been provided an integrating timing device having features whereby it may operate over a very wide temperature range. The device may be compact in size, rugged, lightweight, having no moving fabricated mechanical parts or no complicated or expensive mechanical parts difficult to fabricate, and the device does not have the disadvantages or limitations of liquid chemical type elapsed time indicators in which the liquid freezes at low temperatures or boils at elevated temperatures and renders such chemical liquid types inoperative under these conditions. Because of the features of the solid-state elapsed time indicator, the device may be produced inexpensively and sold in mass volume for use in numerous applications in the electronic, electrical and manufacturing industries.

Since many changes could be made in the above materials and construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language may be said to fall therebetween.

What I claim as new and desire to secure by Letters Patent is:

1. In an electrical unit for measuring and indicating the elapsed time during which a fixed current has been applied to said unit, a flexible polyvinyl plastic tubing and two alloy wire electrodes of stainless steel, each wire inserted into and axially protruding slightly through a plastic plug in each end of the tubing, a mixture of aluminum sulfate and sodium chloride ground together and slightly moistened with saturated sodium chloride solution to form a conductive, semi dry paste, said paste being packed into and contained within said tubing, the ends of the tubing together with the junctions with the wire conductors being cemented with epoxy sealant cement, said electrical unit operating by a color change resulting when the current flow causes a negligible and not readily visible amount of metallic ions to form at the anode and migrate into said paste where a colored precipitate appears, said precipitate being a different color than the original paste, and said precipitate color extending increasingly further outward towards the cathode during increasing time of current flow, said length of this color change being the measure of elapsed time.

2. In an electrical unit for measuring and indicating the elapsed time during which a fixed current has been applied to said unit, a transparent insulating tube with two metallic electrodes, said electrodes positioned at either end of the tube and contacting a semi-solid paste, said paste consisting of one or more inorganic salts, moistened with a small amount of water, said paste being packed into the tube and the ends of the tube sealed, said electrical unit then operating by formation of a colored material developing in the area between the electrodes as direct current flow generates metallic ions at the electrode surface, and potential differences between the electrodes causes the ions to migrate into the said paste where a colored precipitate appears, the extent of length of the color area being the measure of elapsed time.

3. In an electrical unit for measuring and indicating the elapsed time during which a fixed current has been applied to said unit, a transparent insulating tube with two metallic electrodes, said electrodes positioned at either end of the tube and contacting a solid electrolyte, said electrolyte consisting of one or more inorganic salts, said electrolyte being packed into the tube and the ends of the tube sealed, said electrical unit then operating by formation of a material of a different color than the said electrolyte as direct current flow generates metallic ions at the electrode surface, and potential differences between the electrodes causes the ions to migrate into the said electrolyte to produce a colored precipitate, the extent of length of the color area being the measure of elapsed time.

4. In an electrical unit for measuring and indicating the elapsed time during which a fixed current has been applied to said unit, a transparent insulating tube with two alloy electrodes, said electrodes positioned at either end of the tube and contacting a solid electrolyte, said eletcrolyte being packed into the tube and the ends of the tube sealed, said electrical unit then operating by formation of a colored material developing in the area between the electrodes as direct current flow generates metallic ions at an electrode surface and potential differences between the electrodes causes the ions to migrate into the said electrolyte where a colored material appears, said color change being the measure of elapsed time.

5. In an electrical unit for measuring and indicating the elapsed time during which a fixed current has been applied to said unit, a transparent housing containing a solid state conductive material contacted by the two electrodes, and a suitable scale for measuring physical changes taking place within the said solid state material, said electrical unit operating by a visible change taking place within the said solid state material as current flow causes electrochemical reactions to take place at the interfaces between the electrodes and the said solid state material, said visible change being the measure of the elapsed time.

6. In an electrical unit for measuring and indicating the elapsed time during which a fixed current has been applied to said unit, a transparent housing containing a solid state conductive material contacted by two metallic electrodes, and a suitable scale for measuring physical changes taking place at the surface of the said solid state material, said electrical unit operating by a visible change taking place at the surface of the said solid state material as current flow causes generation of a small amount of metallic ions at one of the electrodes, said ions migrating into the said solid state material between the electrodes to produce materials differing in appearance from the original material between the electrodes, the properties of these newly formed materials being the measure of the elapsed time.

7. In an electrical unit for measuring and indicating the elapsed time during which a fixed current has been applied to said unit, a suitable housing containing a solid state conductive material contacted by two electrodes, and a suitable scale for measuring physical changes taking place within the said solid state conductive material, said electrical unit operating by a visible change taking place within the said solid state conductive material as current flow causes oxidation therein, the visible extent of change resulting from this oxidation being the measure of the elapsed time.

8. In an electrical unit for measuring and indicating the elapsed time during which a fixed current has been applied to said unit, a suitable housing containing a solid state electrolyte contacted by two electrodes, and a suitable scale for measuring physical changes taking place within the said electrolyte, said electrical unit operating by a visible change taking place within the said electrolyte as current flow causes reduction of one or more of the ingredients comprising the said solid state electrolyte between the electrodes, said visible changes being the measure of the elapsed time.

9. In an electrical unit for measuring and indicating the elapsed time during which a fixed voltage has been applied, by use of a suitable means to obtain a fixed voltage across the said elapsed time indicating unit, a solid type electrolyte material coated on a conductor, and a second conductor in contact with the outer surface of the said electrolyte material, said electrical unit then operating by a visible change taking place within the said electrolyte material as the voltage causes small amounts of ions to migrate from one of the conductors into the said electrolyte material to produce visible changes within the said electrolyte material, said changes being the measure of the time of operation of the device while the voltage was applied.

10. In an electrical unit for measuring and indicating the elapsed time during which a fixed voltage has been applied, by use of a suitable means to obtain a fixed voltage across the said elapsed time indicating unit, a solid type electrolyte with one surface located on an electrode and a second electrode in contact with an outer surface of the said electrolyte, said electrical unit then operating by the formation of colored patterns developing within the said electrolyte as the voltage causes ions to migrate into the said electrolyte, said formation of colored patterns being the measure of the total time of operation of the device while the voltage was applied.

11. In an electrical unit for measuring and indicating the elapsed time during which a fixed voltage has been applied, by use of a suitable means to obtain a fixed voltage across the said elapsed time indicating unit, a solid type electrolyte material with one surface located on an electrode and a second electrode in contact with an outer surface of the said solid type electrolyte material, said electrical unit then operating by a visible change taking place within the said solid type electrolyte material as an electrochemical reaction causes oxidation to occur within the said solid type electrolyte material, said visible change being the measure of the total time of operation while the said voltage was applied.

12. In an electrical unit for measuring and indicating the elapsed time during which a fixed voltage has been applied, by use of a suitable means to obtain a fixed voltage across the said elapsed time indicating unit, a solid type electrolyte material with one surface located on an electrode and a second electrode in contact with an outer surface of the said solid type electrolyte material, said electrical unit then operating by a visible change taking place within the said solid type electrolyte material as an electrochemical reaction causes reduction to occur within the said solid type electrolyte material, said visible change being the measure of the total time of operation while the said voltage was applied.

References Cited in the file of this patent

UNITED STATES PATENTS

| | | |
|---|---|---|
| 2,655,634 | Kroko | Oct. 13, 1953 |
| 2,906,333 | Ritzenthaler | Sept. 29, 1959 |
| 2,910,647 | Kreitsek et al. | Oct. 27, 1959 |
| 2,932,779 | Tancig | Apr. 12, 1960 |
| 2,970,264 | Eriksen | Jan. 31, 1961 |